US005318453A

United States Patent [19]

Hwang

[11] Patent Number: 5,318,453

[45] Date of Patent: Jun. 7, 1994

[54] ELECTRIC WALL RECEPTACLE

[76] Inventor: Chung-Ho Hwang, #2-608 Seo Hae green A.P.T. #753, Kye San-dong Buk-Ku Inchon, Rep. of Korea

[21] Appl. No.: 969,020

[22] Filed: Oct. 30, 1992

[51] Int. Cl.[5] .............................................. H02G 3/08

[52] U.S. Cl. ...................................... 439/131; 174/57; 439/536; 439/654

[58] Field of Search ....................... 439/131, 536, 654; 220/3.7; 174/48, 57

[56] References Cited

U.S. PATENT DOCUMENTS

| | | | |
|---|---|---|---|
| 2,445,244 | 7/1948 | Seaver | 439/131 |
| 3,027,416 | 3/1962 | Kissel | 200/3.7 |
| 3,794,956 | 2/1974 | Dubreuil | 439/131 |
| 5,023,396 | 6/1991 | Bartee et al. | 174/48 |

FOREIGN PATENT DOCUMENTS

| | | |
|---|---|---|
| 58-11916 | 1/1983 | Japan . |
| 58-34370 | 3/1983 | Japan . |
| 58-34372 | 3/1983 | Japan . |
| 59-69620 | 5/1984 | Japan . |
| 60-108126 | 7/1985 | Japan . |
| 60-177617 | 11/1985 | Japan . |

*Primary Examiner*—Neil Abrams
*Attorney, Agent, or Firm*—Irving M. Weiner; Joseph P. Carrier; Pamela S. Burt

[57] ABSTRACT

A slide type electric wall receptacle comprising a fixed receptacle body and a slide receptacle body slidable along the fixed receptacle body in a direction perpendicular to the front surface of the receptacle body such that it moves between its withdrawn position at which the electric outlets are hidden in the receptacle body and its protruded position at which the electric outlets are exposed externally. The slide receptacle body has at its lower wall electric outlets so that a plug of an electric appliance can be connected to each exposed outlet under the condition that it is disposed in parallel to the front surface of the receptacle. The slide receptacle body comprises a front member provided with the electric outlets and protruded outwardly of the outer plate at the protruded position of the slide receptacle body and a rear member coupled to the front member and disposed in the fixed receptacle body to slide along the fixed receptacle body.

18 Claims, 7 Drawing Sheets

ELECTRIC WALL RECEPTACLE

BACKGROUND OF THE INVENTION

1. Field of the Invention

The present invention relates to an electric receptacle, and more particularly to an electric wall receptacle having shuttable electric outlets.

2. Description of the Prior Art

Generally, a known electric receptacle is of a front exposed and fixed type wherein it comprises a receptacle body fixed to a wall and electric contact prongs of an electric plug are inserted into apertures of each outlet of the receptacle body in a direction perpendicular to the receptacle body. In such a receptacle, the apertures of each outlet are arranged fixedly and exposedly on the front surface of the receptacle body in which electric contact terminals are contained. The apertures provide access to the contact terminals disposed inwardly of the apertures.

Referring to FIGS. 20 and 21, there is illustrated an example of such a general electric receptacle.

As shown in FIG. 20 which is a front view, the receptacle comprises a receptacle body 70 having a front surface provided with externally exposed apertures 60. When viewed in FIG. 21, which is a side view, the apertures 60 extend from the front surface arranged at the same plane as the front surface of an outer plate 40, inwardly, that is, in perpendicular to the front surface of outer plate 40.

Near the inner ends of apertures 60, contact terminals 62 are fixedly mounted to the receptacle body 70. The receptacle body 70 is fixed to a fixing member 72 which is, in turn, mounted to a box 32 buried in a wall 30 by means of screws 34.

Although other various receptacles have been known, they are the same as the above-mentioned receptacle, in terms of the basic construction being of the front exposed and fixed type requiring electric contact prongs of an electric plug to be inserted into apertures of each outlet of the receptacle body in a direction perpendicular to the receptacle body.

In case of using the above-mentioned type of receptacles, an electric plug 46 is connected to the receptacle by inserting its contact prongs into the apertures of receptacle in a direction perpendicular to the receptacle body 70, as shown in FIG. 21.

However, this type of connection wherein the plug 46 is connected to the receptacle body 70 in a direction perpendicular to the receptacle body causes the plug 46 to protrude forwardly of the receptacle and thereby occupy a considerable space at the front of the wall to which the receptacle is installed. Such a protrusion of plug 46 results in a degradation in appearance and lacking a sense of security. The protruded plug 46 may be also an obstacle to other objects. In particular, where the receptacle have a plurality of outlets, the above-mentioned disadvantages become severe since a plurality of plugs 46 are disorderly connected to the receptacle and disorderly protruded from the receptacle.

In the above case, when the plug 46 is coupled to the receptacle, an electric cord 47 which is connected to the rear end of the plug 46 is bent at the rear end of plug vertically or laterally. Due to such a bending, a part of inner wires of the cord are likely to be cut off. As a result, a spark may occur at the cut-off wire portions of the cord upon shifting the cord, so that other wires and claddings may be degraded or melted by a heat generated due to the spark. This may result in a fire.

Another disadvantage of the conventional receptacle is that since the contact terminals coupled to an electric power source is exposed to external through the apertures, infants and small children not only can block up the apertures easily, but also easily contact with the contact terminals by insertion of metal objects into the apertures and thereby are in a danger of receiving an electric shock. In cases of playing with a heating appliance such as an electric pot, an electric frying pan or an electric iron, they can easily connect the plug of the heating appliance to the receptacle since the apertures of the receptacle are directly exposed. Where the plug is carelessly coupled to the receptacle as mentioned above, the heating appliance may be overheated, thereby causing the children to suffer heavy burns and the appliance to be damaged. Moreover, there is a danger of a fire.

The conventional receptacle has another disadvantage that it injures the beauty of interior decoration because at least two apertures thereof are exposed outwardly. It has also a limitation on the design of its appearance, in that the exposure of apertures is inevitably involved in designing its outer plate and receptacle body.

In case of a multi-apertured receptacle having a plurality of outlets, the size of the receptacle body increases, only in one direction, in proportion to the number of outlets since the outlets are arranged on the front surface of receptacle body to align with one another. As a result, the overall construction of the receptacle is bulky in planar, resulting in an increase in manufacture cost.

Such a multi-apertured receptacle often has no utility, not only because it is not only expensive, but also because when it is buried in a wall of a house or building, the number and arrangement of outlets thereof do not often meet the requirement of user.

For instance, the installed receptacle may be partially hidden by a furniture or other facility installed in the house. Otherwise, an electric appliance may have a short length of cord insufficient to be connected to the fixedly installed receptacle. It may be also required to further increase the number of outlets, for using several electric appliances simultaneously. In these cases, it is needed to extend electric power wires from the electric power source outwardly of the receptacle and connect a separate electric receptacle to the electric power wires, for increasing the number of outlets or lengthening the cord. Otherwise, a separate multi-apertured receptacle may be used which has a long cord provided at its one end with a plug. Only in case of increasing the number of outlets, a separate multi-apertured receptacle with a plug may be coupled to the fixedly installed receptacle. However, a part of or all the methods have disadvantages of being dangerous when practiced by unskilled persons, increasing cost in installation and manufacture, and degrading the beauty of appearance.

Accordingly, there have been many proposals for overcoming the disadvantages encountered in the above-mentioned receptacles. However, the applicant believes that none of the proposals does not eliminate fully all of the above-mentioned disadvantages. They solve only a part of the disadvantages and rather encounter other disadvantages making them have no utility.

There have been also proposed floor receptacles distinguishable from the above-mentioned general receptacles. These floor receptacles are disclosed in Japanese Laid-open Utility Model Publication Nos. Sho 58-11916, Sho 58-34370, Sho 58-34372, Sho 59-69620, Sho 60-108126 and Sho 60-177617.

These floor receptacles have a construction comprising a receptacle body buried in a floor and provided with an outer plate, and a cover formed at the center portion of outer plate and pivotally connected to the outer plate. Electric outlets and connect terminals are formed at the lower portion of cover to be integral with or separated from the cover so that the electric outlets are exposed to external upon opening the cover and hidden in the receptacle body upon closing the cover. Upon closing, the cover is flush with the outer plate of receptacle body. At one side of the receptacle body, a pivotal support member is provided which carries a compression spring adapted to always urge the cover toward its opening position. At one side of the outer plate, a locking member with a manipulation button is disposed to lock the cover at its closing position. With this construction, when the receptacle is at a normal state, namely, a non-use state, it can be maintained at the condition wherein the cover is closed so as to hide the outlets in the receptacle body. When the receptacle is desired to be used, the outlets can be exposed by manipulating the manipulation button to release the locking of the cover by the locking member, so that the plug of an electric appliance can be inserted into the exposed outlet.

Although being more or less complex, these floor receptacles which have the provision of the pivotally opening and closing cover are very advantageous, when they are installed in a floor, in that the outlets are normally hidden in the receptacle body buried in the floor, as compared with the above-mentioned wall receptacles.

For example, where the above-mentioned wall receptacles are installed at the floor, the outlets are always exposed upwardly to external, so that foreign matters are likely to enter the exposed apertures of the outlets, resulting in blocking of the apertures, damaging of the receptacle and short circuiting. Whereas, the floor receptacles as mentioned above solve effectively the problems encountered in the wall receptacles.

Where the floor receptacles are applied to a wall, they may also exhibit an advantage of partially solving the problems of the wall receptacles. However, the application is difficult to widely extend to all of the wall receptacles and other general type receptacles.

In constructions of the floor receptacles, the cover is pivotally lifted upon opening and maintained at inclined state, so that the outlets and contact terminals disposed beneath the cover are also protruded at inclined state. As a result, the protruded area at which the outlets are formed is naturally small.

In case of applying to plugs having no ground prong, the floor receptacles can have up to two outlets at each side of its protruding member. In case of applying to triangular plugs having three prongs including the ground prong, however, they are difficult to have two outlets at each side of its protruding member.

The outlets are arranged along the protruding member and thus disposed inclinedly due to the inclination of the protruding member. When a plug is coupled to the inclinedly disposed outlet, therefore, it is inclinedly held, thereby causing the connection condition to be unstable and the appearance to be bad.

Consequently, such pivotal receptacles are improper to use as wall receptacles, although being useful as floor receptacles which are used occasionally.

SUMMARY OF THE INVENTION

Therefore, an object of the invention is to provide an electric wall receptacle capable of eliminating the above-mentioned disadvantages encountered in the prior arts and being economical and practical, thereby being widely used for various applications.

Another object of the invention is to provide an electric wall receptacle having a basic construction wherein electric outlets and contact terminals are separated from a receptacle body and formed at a separate member which is slidable in perpendicular to the front surface of the receptacle body such that it moves between its withdrawn position at which the electric outlets are hidden in the receptacle body and its protruded position at which the electric outlets are exposed to external so that a plug of an electric appliance can be connected to each exposed outlet under the condition that it is disposed in parallel to the front surface of the receptacle.

Another object of the invention is to provide an electric wall receptacle having a construction capable of hiding its electric outlets and contact terminals in its receptacle body when not in use, so that the outlets is protected from foreign matters, contact of infants and small children and careless use, thereby avoiding damages of the outlets and contact terminals, a danger of receiving an electric shock and other involved dangers.

Another object of the invention is to provide an electric wall receptacle having a construction capable of hiding its disfiguring electric outlets and contact terminals in its receptacle body when not in use, so that its front surface can be subjected to various design and decoration treatments, thereby improving the appearance.

Another object of the invention is to provide an electric wall receptacle having a construction capable of having a plurality of cubically arranged electric outlets while maintaining its compactness, thereby reducing cost and labor in manufacture and installation and improving the appearance upon connecting plugs thereto.

Still another object of the invention is to provide an electric wall receptacle having a construction capable of having a plurality of electric outlets arranged such that plugs to be connected can be inserted into the outlets in parallel to the front surface of the receptacle and arranged with one another in a direction that their thickness portions align with one another, thereby not only greatly reducing the overall connection width, but also preventing bending of a cord at each plug and cut-off of the cord, resulting in lengthening the life and improving the plug connection appearance.

In accordance with the present invention, these objects can be accomplished by providing a slide type electric receptacle comprising: a fixing plate mounted to a box buried in a place at which the receptacle is to be installed; a fixed receptacle body inserted into the box and supported at its front end to the fixing plate, the fixed receptacle body having at its front end an opening; an outer plate mounted to the fixing plate and provided with an opening; a slide receptacle body having a box shape including opposite side walls and a lower wall and inserted into the fixed receptacle body through the opening of the outer plate and the opening of the fixed receptacle body, the slide receptacle body having at least one electric outlet at least one of the walls thereof and at least one set of electric contact terminals aligned with the electric outlet at its interior, the slide receptacle body also being slidable forwardly and rearwardly in a direction perpendicular to the outer plate between a protruded position where the electric outlet is exposed externally of the receptacle body and a withdrawn position where the electric outlet is hidden in the fixed receptacle body; a compression coil spring adapted to urge the slide receptacle body toward the protruded position; means for electrically connecting the electric contact terminals to an electric power source; and means for controlling sliding movement of the slide receptacle body between the protruded position and the withdrawn position, and to selectively lock the slide receptacle body at the withdrawn position.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Referring to FIGS. 1 to 19, there are illustrated slide type electric wall receptacles having shuttable electric outlets in accordance with embodiments of the present invention.

FIGS. 1 to 9 shows a slide type electric wall receptacle in accordance with an embodiment of the present invention.

Figure 1:
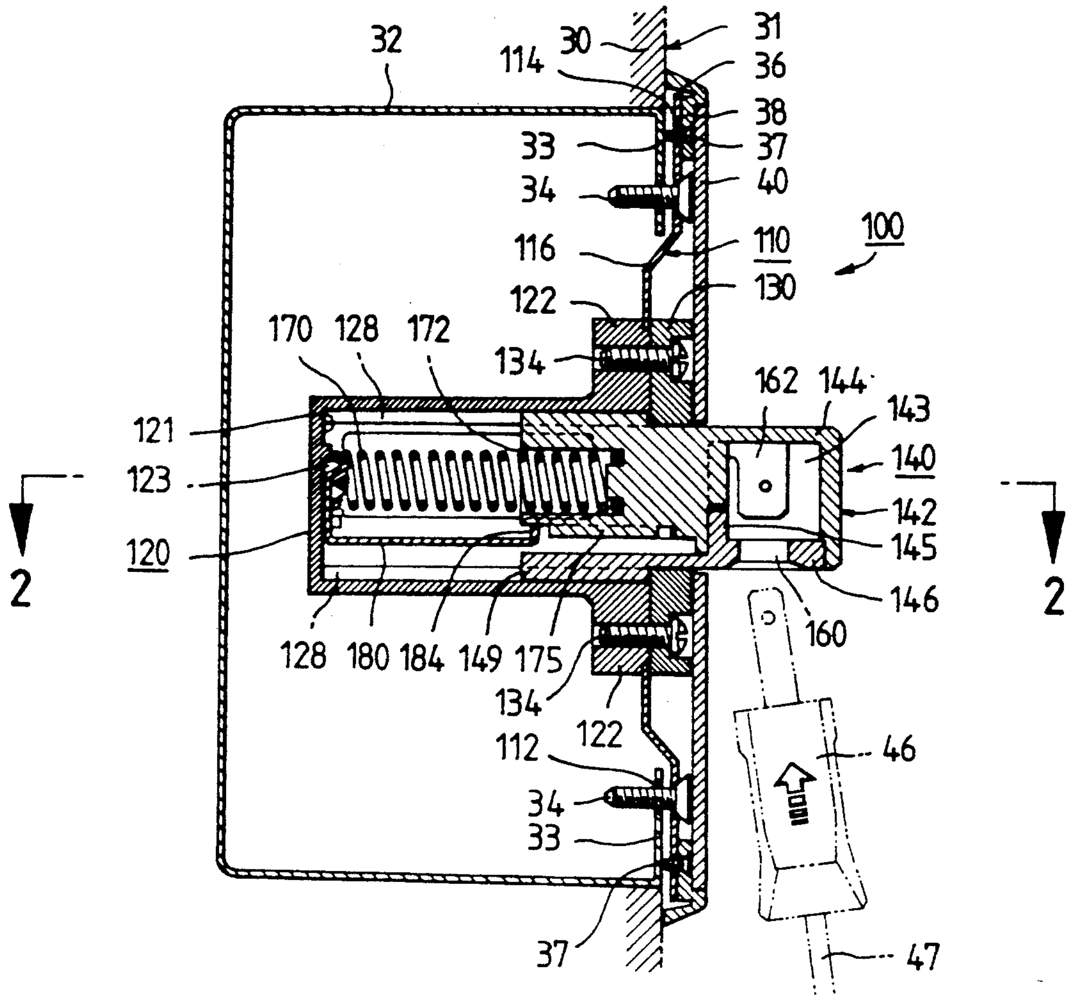
FIG. 1 is a sectional view of a slide type electric wall receptacle in accordance with an embodiment of the present invention.

The reference numeral 100 denotes the slide type electric wall receptacle having a single electric outlet. As shown in FIG. 1, the receptacle 100 comprises a fixing plate 110 which is mounted at its upper and lower ends to the upper and lower ends of a box 32 buried in a wall 30, respectively, by means of screws 34 and a fixed receptacle body 120 inserted into the interior of the box 32 through an central opening formed at the fixing plate 110 and supported at its front end to the fixing plate 110 by means of a support plate 130 having a central opening and screws 134.

The fixed receptacle body 120 has a hollow box shape having a front portion with a flange 122 adapted to be mounted to the fixing plate 110 by means of screws 134. The receptacle body flange 122 has threaded holes 124 to which the screws 134 are coupled.

The receptacle 100 also comprises an outer frame 36 mounted to the front surface of the fixing plate 110 by means of screws 37 such that its outer peripheral edge is in close contact with the surface 31 of wall 30, an outer plate 40 coupled to the outer frame 36 by means of coupling protrusions 38 formed at the outer plate 40 and provided at its central portion with a rectangular opening 42, and a slide receptacle body 140 slidably inserted into the fixed receptacle body 120 through the central rectangular opening 42 of the outer plate 40 and provided with a front end 142 protrudable forwardly out of the outer plate 40. The slide receptacle body 120 has a cross-section corresponding the rectangular opening 42 of the outer plate 40.

For being easily applied to the existing construction of box 32, the fixing plate 110 has a fixing portion 116 provided with box fixing apertures 112 in which the screws 34 are inserted and outer frame fixing apertures 114 in which the screws 134 are inserted, all the apertures being of the same standard as the conventional apertures. The fixing plate 110 also has engaging portions 118 engaged in grooves 124 formed at both side edges and four corners of the front surface of the receptacle body flange 122. Each groove 124 has a depth corresponding to the thickness of the fixing plate 110.

With this construction, the receptacle body flange 122 and thus the fixed receptacle body 120 can be firmly supported to the fixing plate 110.

The slide receptacle body 140 which is inserted into the fixed receptacle body 120 can slide forwardly and rearwardly, that is, right and left in FIG. 1. The slide receptacle body 140 has apertures 160 constituting an electric outlet and electric contact terminals 162.

A compression coil spring 170 is interposed between the rear portion of slide receptacle body 140 and the facing inner wall surface 121 of fixed receptacle body 120. The compression coil spring 170 serves to urge the slide receptacle body 140 forwardly, that is, outwardly of the fixed receptacle body 120.

The fixed receptacle body 120 is also provided at its upper and lower wall portions with guide grooves 128 extending longitudinally throughout its length. On the other hand, the slide receptacle body 140 is provided at its upper and lower surfaces with laterally spaced guide protrusions 148 and 149 engaged in the guide grooves 128 of the fixed receptacle body 120, respectively. The provision of guide grooves 128 and guide protrusions 148 and 149 makes the slide receptacle body 140 slide smoothly along the fixed receptacle body 120 without causing any looseness. The guide protrusions 148 and 149 also cooperate with the peripheral edge of the central opening of support member 130, so as to serve as a stopper for preventing the slide receptacle body 140 from separating out of the fixed receptacle body 120 during the forward slide movement thereof.

The slide receptacle body 140 comprises an upper member 144 of a solid box type and a lower member 146 of a plate type coupled to the upper member 144. The upper member 144 is provided at its lower portion with a recess which defines, together with the upper surface of lower member 146, a space 178. The space 178 serves as an actuating space, as will be described hereinafter. The upper member 144 has at its rear portion a cylindrical hole 172 for receiving one end of the compression coil spring 170. The lower member 146 of the slide receptacle body 140 has the above-mentioned apertures 160 aligned respectively with the electric contact terminals 162 and a partition portion 145 disposed between the electric contact terminals 162. The coupling between the upper and lower members 144 and 146 are achieved by connecting bolts 147.

The slide receptacle body 140 also has at its front portion a space 143 in which a pair of electric contact terminals 162 directed downwardly are disposed. Each electric contact terminal 162 has a connecting member 164 extending to the rear end of the slide receptacle body 140 along the corresponding side portion of the slide receptacle body 140. Each connecting member 164 is provided at its rear end a wiring terminal portion 166 to which a wiring screw 168 which may be connected to an electric power source wire is coupled.

Figure 2:
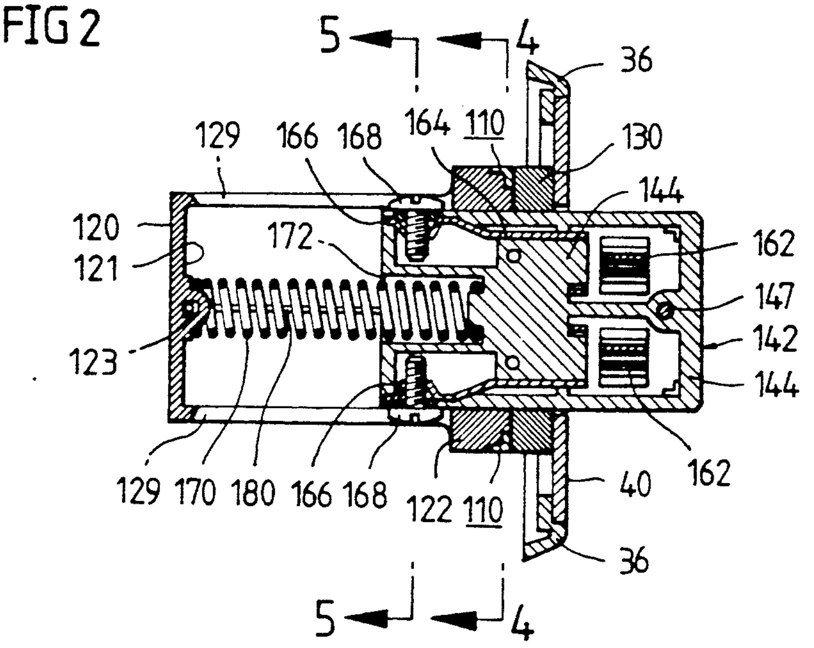
FIG. 2 is a cross-sectional view taken along the line 2—2 of FIG. 1, showing a condition that a slide receptacle body is disposed at its protruded position.
Figure 3:
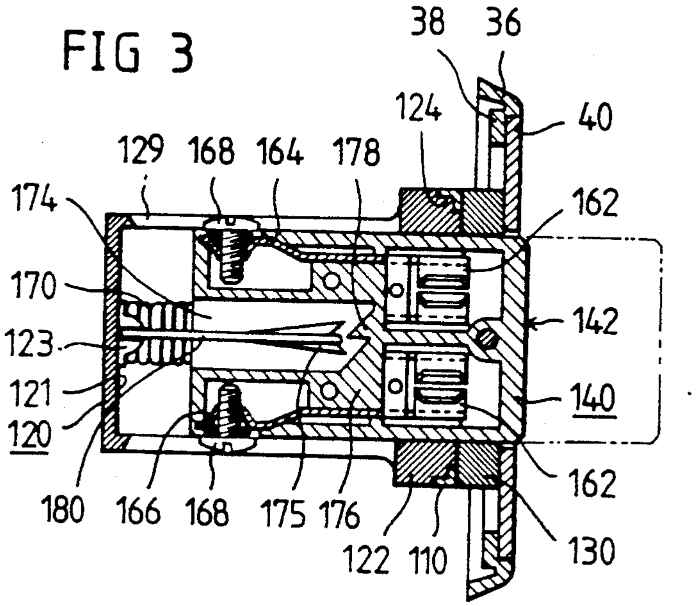
FIG. 3 is a view similar to FIG. 2, showing a condition that the slide receptacle body is disposed at its withdrawn position.
Figure 4:
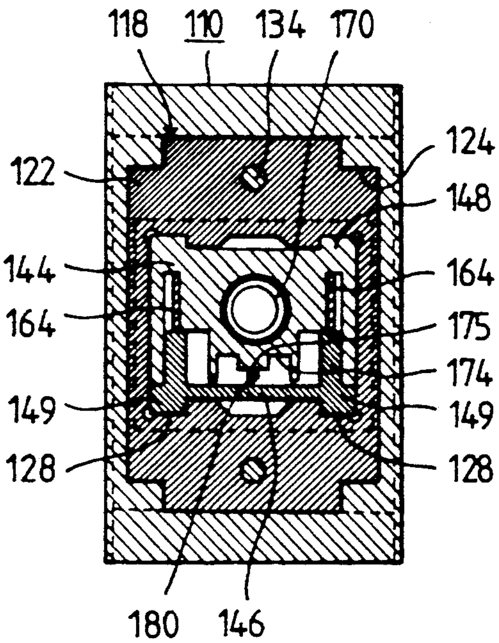
FIG. 4 is a cross-sectional view taken along the line 4—4 of FIG. 2.
Figure 5:
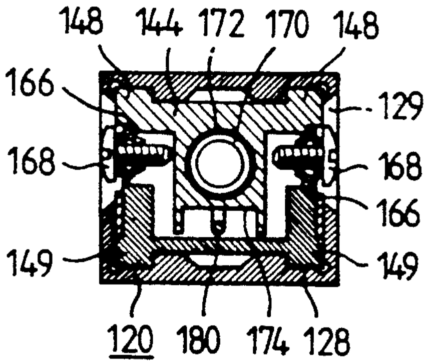
FIG. 5 is a cross-sectional view taken along the line 5—5 of FIG. 2.
Figure 6:
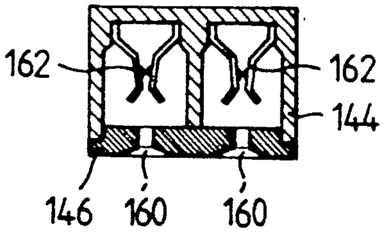
FIG. 6 is a sectional view of electric contact terminals disposed in the slide receptacle body.

The connection of wiring terminal portions 166 of electric contact terminals 162 with the electric power source wires can be variously achieved. The most basic construction for such a connection is shown in FIG. 2. As shown in FIG. 2, the construction comprises a pair of slots 129 formed at both side wall of the fixed receptacle body 120 and adapted to receive the wiring screws 168 and avoid them from being interfered during their forward and rearward slide movements. In the slots 129, electric power source wires are received and coupled to the wiring terminal portions 166 of electric contact terminals 162, so as to make the electric contact terminals 162 be connected with the electric power source. In the slots 129, the electric power source wires have a sufficient length, so as not to interfere the sliding movement of the slide receptacle body 140.

With this construction, the electric power source wires are always maintained in a connection condition with the wiring terminal portions 166 of electric contact terminals 162, during the forward and rearward movements of the slide receptacle body 140, thereby preventing the electric contact terminals 162 from being disconnected from the electric power source.

In accordance with this embodiment of the present invention, the receptacle 100 also comprises a control device for controlling the forward and rearward movements of the slide receptacle body between its withdrawn position and its protruded position.

Figure 7:
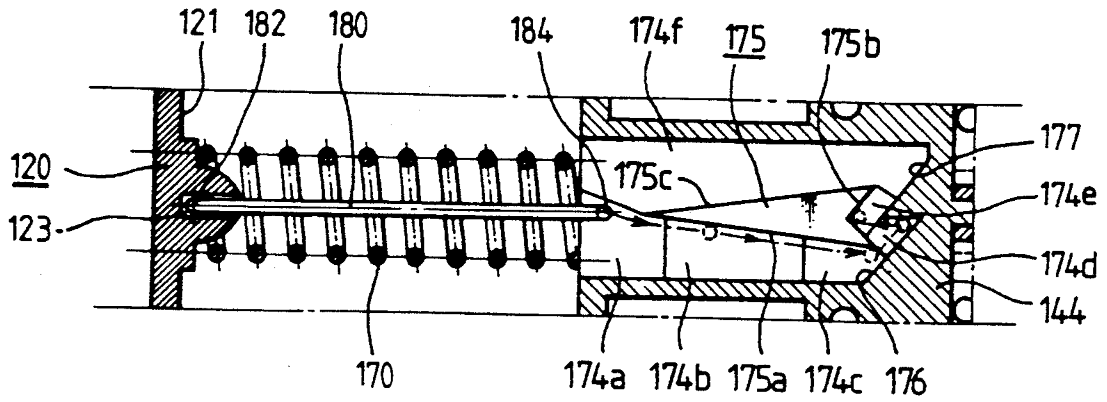
FIG. 7 is an enlarged view of a control device for controlling the slide movement of slide receptacle body shown in FIG. 3, showing a condition when the slide receptacle body is disposed at its protruded position.
Figure 8:
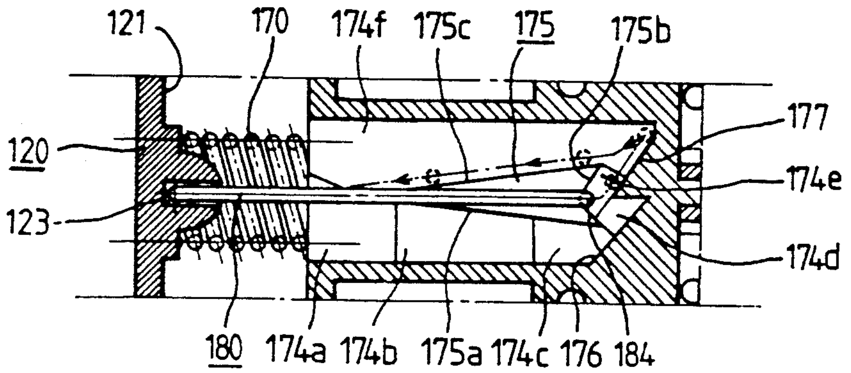
FIG. 8 is a view similar to FIG. 7, showing a condition when the slide receptacle body is disposed at its withdrawn position.
Figure 9:
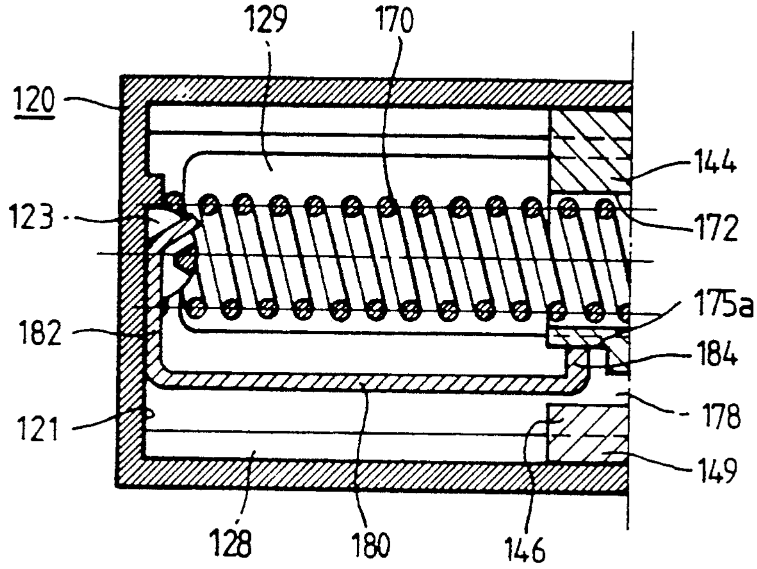
FIG. 9 is an enlarged view of a portion of a fixed receptacle body shown in FIG. 1, to which an actuating rod of the control device is mounted.

In the embodiment shown in FIGS. 1 to 9, the control device is a rod type push-push mechanism comprising an actuating rod 180 disposed in an actuating space 178 defined in the slide receptacle body 140 between the lower surface of upper member 144 and the upper surface of lower member 146. The actuating rod 180 has a rear bent end 182 fitted in a hole 123 formed at the rear wall 121 of fixed receptacle body 120 so that it can freely pivot about the rear bent end 182, as shown in FIG. 9. The actuating rode 180 also has a front bent end 184 serving as an actuating end. The rear end 182 of the actuating rod 180 is pressed against the rear wall 121 of fixed receptacle body 120 by the force of the compression coil spring 170, thereby causing the actuating end 184 of actuating rod 180 to be urged toward the center of the slide receptacle body 140.

The mechanism also comprises a plurality of guide surfaces 174*a* to 174*f* for guiding the movement of the actuating end 184 of actuating rod 180 during the movement of the slide receptacle body 140 and a plurality of guide jaws 175 to 177 for guiding the movement of the actuating end 184 of actuating rode 180 along the guide surfaces 174*a* to 174*f*, and a V-shaped locking groove 175*b* for engaging with the actuating end 184 of actuating rod 180 and thus locking the slide receptacle body 140 at its withdrawn position. The V-shaped locking groove 175*b* is provided at the front end of the guide jaw 175.

The guide jaw 175 also has opposite side guide surfaces 175*a* and 175*c*. The side guide surface 175*a* serves to guide the actuating end 184 of actuating rod 180 to move along the guide surfaces 175*a* and 174*b* during the rearward slide movement of the slide receptacle body 140. On the other hand the side guide surface 175*c* serves to guide the actuating end 184 of actuating rod 180 to move along the guide surface of 174*f* during the forward slide movement of the slide receptacle body 140.

The guide jaw 176 serves to guide the actuating end 184 of actuating rod 180 to move from the guide surface 174*b* to the V-shaped locking groove 175*b* of guide jaw 175 along the guide surface 174*c* and 174*d* during a temporary forward slide movement of the slide receptacle body 140 temporarily carried out just after the completion of the rearward slide movement. On the other hand, the guide jaw 177 serves to guide the actuating end 184 of actuating rod 180 to move from the V-shaped locking groove 175*b* of guide jaw 175 to the guide surface 174*f* along the guide surfaces 174*d* and 174*e* during a temporary rearward slide movement of the slide receptacle body 140 temporarily carried out just before the initiation of the forward slide movement.

The guide surface 174*d* is formed at a level lower than that of the guide surface 174*c*. The guide surface 174*e* is formed at a level lower than that of the guide surface 174*d*. The guide surface 174*f* is formed at a level lower than that of the guide surface 174*e*. On the other hand, the guide surface 174*f* has a portion with a level lower than that of the guide surface 174*a*.

Now, operations of the control device controlling the forward and rearward slide movements of the slide receptacle body 140 for exposing and hiding the electric outlet will be described.

FIG. 7 shows a condition that the slide receptacle body 140 is disposed at its protruded position. At this time, the actuating end 184 of actuating rod 180 is in pressing contact with the actuating guide surface 174*a*. This is because the actuating end 184 of actuating rod 180 is urged toward the center of the slide receptacle body 140, as the rear end 182 of the actuating rod 180 is pressed by the force of the compression coil spring 170. In such a condition, the slide receptacle body 140 is maintained at its protruded position where the front portion thereof is forwardly protruded out of the fixed receptacle body 120. At the protruded position of the slide receptacle body 140, the apertures 160 of electric outlet and thus the electric contact terminals 162 are externally exposed so that a plug 46 of an electric appliance (not shown) can be connected to the receptacle body 140 through the exposed apertures 160 under the condition that the plug is disposed in parallel to the front surface of the receptacle.

In this state, as the front end 142 of the slide receptacle body 140 is rearwardly pushed, the actuating end 184 of actuating rod 180 moves along the guide surfaces 174*a* and 174*b* guided by the lower guide surface 175*a* of guide jaw 175, and then along the guide surface 174*c* guided by the guide jaw 176.

At this time, when the force applied to the slide receptacle body 140 released, the slide receptacle body 140 moves slightly forwardly by virtue of the force of compression coil spring 170 and the actuating end 184 of actuating rod 180 is guided to move from the guide surface 174*c* to the guide surface 174*e* and then is seated in the V-shaped locking groove 175*b* of the engaging jaw 175, as shown in FIG. 8.

As the front end 184 of actuating rod 180 is seated in the V-shaped locking groove 175*b* of the guide jaw 175 as mentioned above, the slide receptacle body 140 is prevented from further moving forwardly. Thus, the slide receptacle body 140 is locked at its withdrawn position where the apertures of electric output are hidden in the fixed receptacle body 120.

When the slide receptacle body 140 is desired to be protruded out of the fixed receptacle body 120, so as to expose the apertures 160 of electric outlet, and thus to insert the contact prongs of plug 46 into the apertures 160, the front end 142 of slide receptacle body 140 is slightly pushed rearwardly.

That is, as the slide receptacle body 140 moves rearwardly slightly against the force of compression coil spring 170, the actuating end 184 of actuating rod 180 locked at the V-shaped locking groove 175*b* is guided by the guide jaw 177 to move along the guide surface 174*e* and thus to separate from the V-shaped locking groove 175*b*. In this state, when the pushing force applied to the front end 142 of slide receptacle body 140 is released, the slide receptacle body slides forwardly by virtue of the force of compression coil spring 170, until the protrusions 148 and 149 thereof come into contact with the peripheral edge of the central opening of support member 130. During this forward sliding movement of slide receptacle body 140, the actuating end 184 of actuating rod 180 moves from the guide surface 174*e* along the guide surface 174*f* guided by the guide surface 175*c* of guide jaw 175 and then reaches the guide surface 174*a*. Thus, the slide receptacle body 140 is again disposed at its protruded position where the apertures 160 of electric outlet are exposed to external. At this protruded position of slide receptacle body 140, the plug 46 of an electric appliance (not shown) can be inserted upwardly into the exposed apertures 160 in parallel to the front surface of the receptacle.

As mentioned above, the forward and rearward sliding movements of slide receptacle body 140 can be controllably achieved by simply pushing the front end 142 of slide receptacle body 140. Accordingly, there is a convenience in use.

Figure 15:
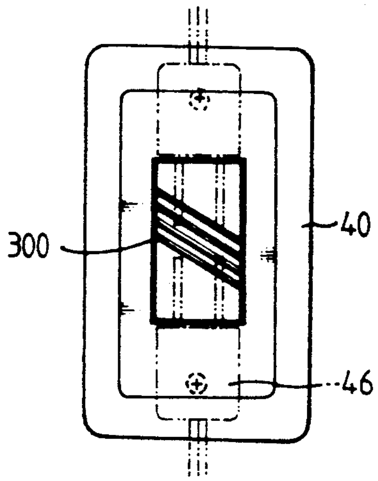
FIG. 15 is a front view of a slide type electric wall receptacle in accordance with another embodiment of the present invention.
Figure 17:
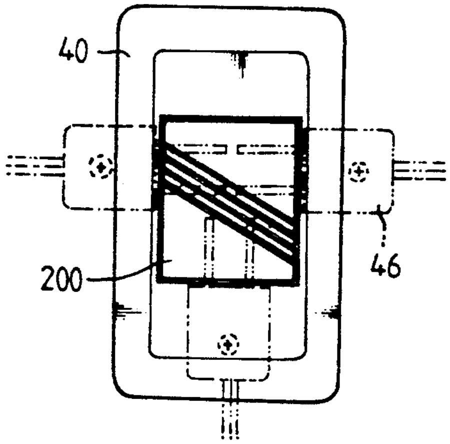
FIG. 17 is a front view of a slide type electric wall receptacle in accordance with another embodiment of the present invention.
Figure 16:
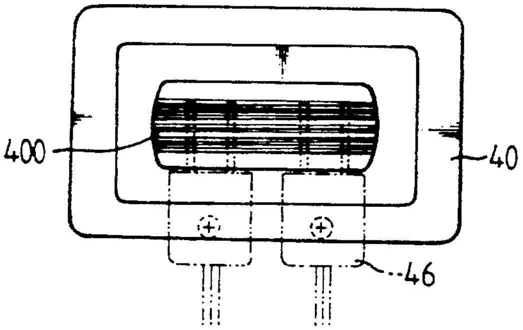
FIG. 16 is a front view of a slide type electric wall receptacle in accordance with another embodiment of the present invention.
Figure 18:
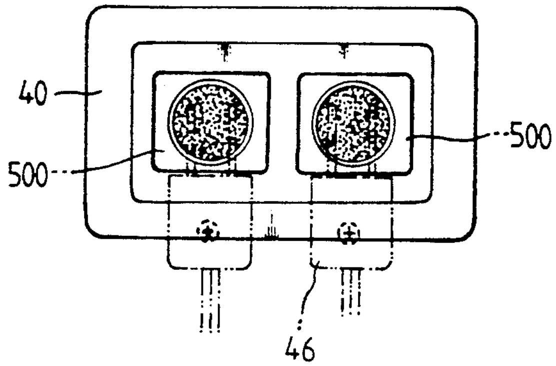
FIG. 18 is a front view of a slide type electric wall receptacle in accordance with another embodiment of the present invention.
Figure 19:
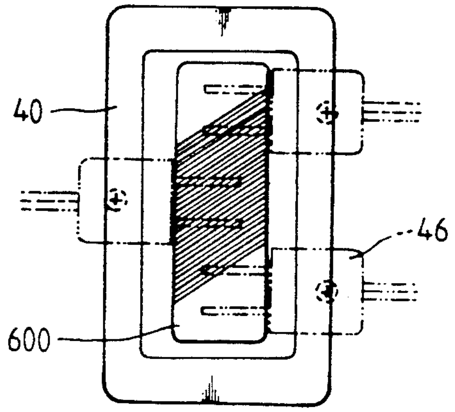
FIG. 19 is a front view of a slide type electric wall receptacle in accordance with another embodiment of the present invention.
Figure 20:
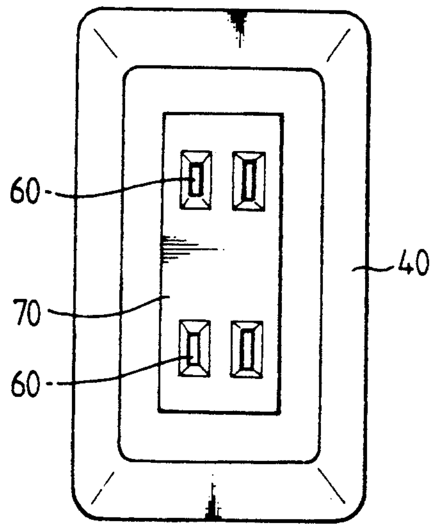
FIG 20 (PRIOR ART)
FIG. 20 is a front view of a conventional fixed type electric wall receptacle.
Figure 21:
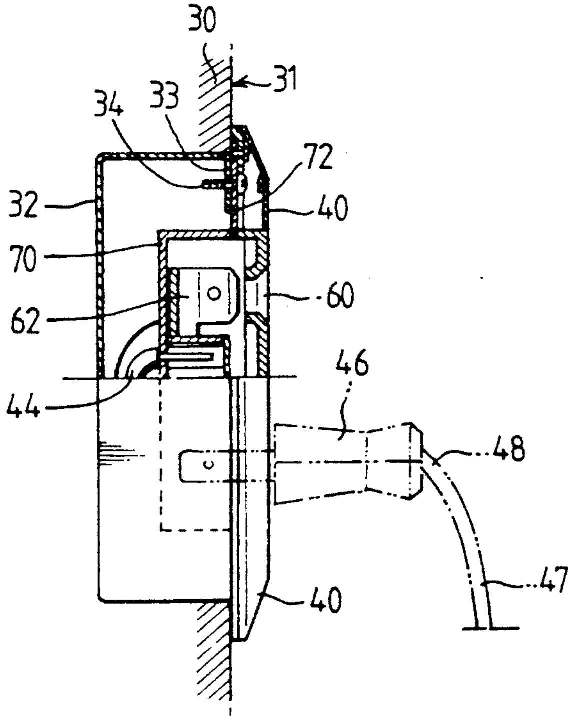
FIG 21 (PRIOR ART)
FIG. 21 is a partially sectioned side view of the fixed type electric wall receptacle shown in FIG. 20.

Although the present invention has been described as being embodied as a single-apertured receptacle having one electric outlet in the above-mentioned embodiment, it can be embodied as other receptacles having different outlets in number and direction, by properly varying the construction of slide receptacle body in size and length. Examples of such receptacles are illustrated in FIGS. 15 to 19, wherein; FIG. 15 shows a vertically double-apertured receptacle 300 having a pair of outlets at its upper and lower portions, respectively, FIG. 16 shows a laterally double-apertured receptacle 400 having a pair of outlets at its right and left side portions, respectively, FIG. 17 shows a three-directional-apertured receptacle 200 having three outlets at its opposite side portions and lower portion, respectively, FIG. 18 shows a longitudinally double-apertured receptacle 500 having two separate longitudinally aligned outlets at its lower portion, and FIG. 19 shows a laterally triple-apertured receptacle 600 having three laterally aligned outlets at its central portion. As shown in FIG. 18, two or more slide receptacle bodies which can be individually slidable may be mounted to a single fixed receptacle body. In this case, they may be vertically or laterally aligned with another.

Referring to FIG. 10 to 14, there is illustrated another receptacle in accordance with another embodiment of the present invention. The receptacle of this embodiment has a control device for controlling the forward and rearward movements of the slide receptacle body and a construction for connecting the electric contact terminals with the electric power source wires, which are different from those of the receptacle of the previous embodiment.

The receptacle of this embodiment has a ball type control device and an electric connection construction using no screws. The electric connection between the electric contact terminals and the electric power source wires is selectively maintained when the slide receptacle body is disposed at its protruded position.

Figure 10:
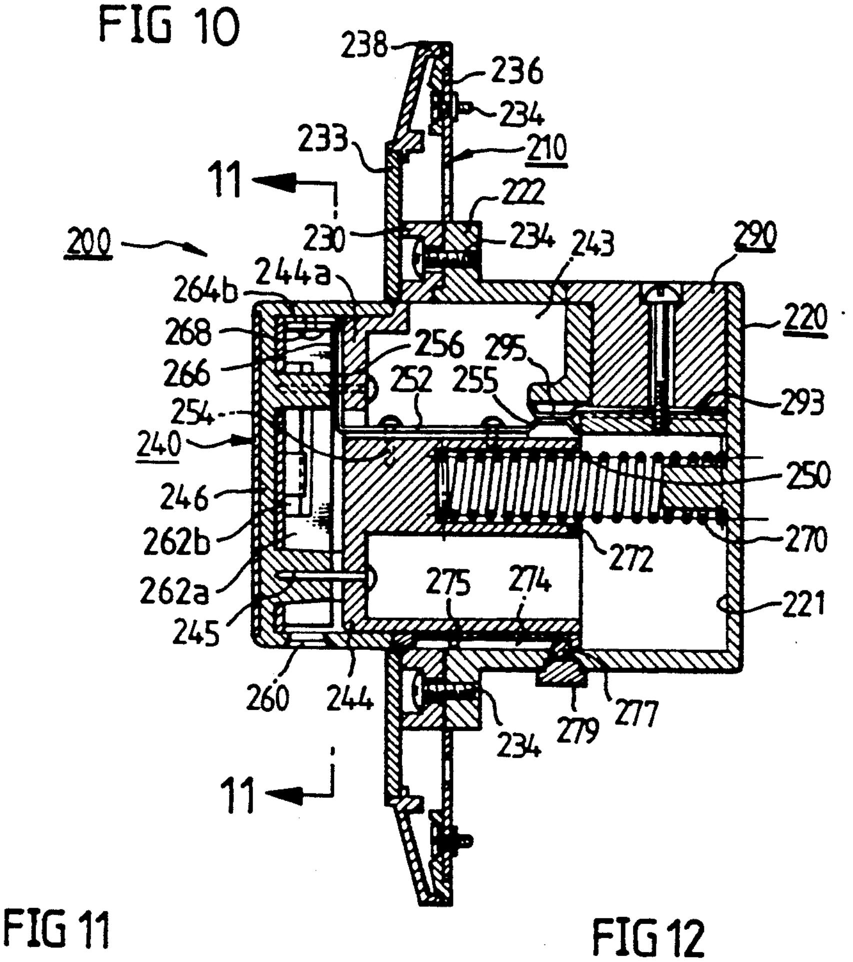
FIG. 10 is a sectional view of a slide type electric wall receptacle in accordance with another embodiment of the present invention, showing a condition that a slide receptacle body is disposed at its protruded position.

In FIG. 10, the reference numeral 200 denotes a slide type electric wall receptacle having three electric outlets. As shown in FIG. 1, the receptacle 200 comprises a fixing plate 210 which is mounted at its upper and lower ends to the upper and lower ends of the box 32 buried in the wall 30, respectively and a fixed receptacle body 220 inserted into the interior of the box 32 through an central opening formed at the fixing plate 210 and supported at its front end to the fixing plate 210 by means of a support plate 230 having a central opening and screws 234.

The fixed receptacle body 220 has a similar construction with that of the previous embodiment. That is, the fixed receptacle body 220 has a hollow box shape having a front portion with a flange 222 adapted to be mounted to the fixing plate 210 by means of the screws 234. However, the fixed receptacle body 220 has a length longer than that of the previous embodiment, so as to receive an elongated slide receptacle body 240 with three electric outlets.

The receptacle also comprises an outer frame 236 mounted to the front surface of the fixing plate 210 by means of screws such that its outer peripheral edge is in close contact with the surface of wall 30 and an outer plate 233 coupled to the outer frame 236 by means of coupling protrusions 238 formed at the outer plate 233 and provided at its central portion with a rectangular opening.

The slide receptacle body 240 which is slidably inserted into the fixed receptacle body 220 is provided with a front end protrudable forwardly out of the outer plate 233. The slide receptacle body 240 has at its opposite side portions and lower portion respective apertures 260*a*, 260*b* and 260*c* of three outlets. Within the slide receptacle body 240, a pair of electric contact terminals 262*a* and 262*b* are arranged in a X-shaped manner. The slide receptacle body 240 inserted into the fixed receptacle body 220 can slide forwardly and rearwardly, that is, left and right in FIG. 10.

A compression coil spring 270 is interposed between the rear portion of slide receptacle body 240 and the facing inner wall surface 221 of fixed receptacle body 220. The compression coil spring 270 serves to urge the slide receptacle body 240 forwardly, that is, outwardly of the fixed receptacle body 220.

The fixed receptacle body 220 is also provided at its inner surfaces of opposite side wall portions with guide grooves 228 extending longitudinally throughout its length. On the other hand, the slide receptacle body 240 is provided at its opposite side surfaces with laterally spaced guide protrusions 248 and 249 engaged in the guide grooves 228 of the fixed receptacle body 220, respectively. The provision of guide grooves 228 and guide protrusions 248 and 249 makes the slide receptacle body 240 slide smoothly along the fixed receptacle body 220 without causing any looseness. The guide protrusions 248 and 249 also cooperate with the peripheral edge of the central opening of support member 230, so as to serve as a stopper for preventing the slide receptacle body 240 from separating out of the fixed receptacle body 220 during the forward sliding movement thereof.

The slide receptacle body 240 comprises a rear member 244 of a box type and a front member 246 of a box type coupled to the rear member 244, by means of a plurality of screws 245. The slide receptacle body 240 with the above-mentioned construction has a width and a height which are properly determined for achieving a smooth horizontal sliding movement without any vertical and lateral looseness.

The rear member 244 has at its rear portion a cylindrical hole 272 for supporting one end of the compression coil spring 270. Over the cylindrical hole 272, the rear member 244 also has a space 243 opened at its upper portion. A pair of laterally spaced electric connecting terminals 252 and 253 is disposed at the lower surface of the space 243 by means of fixing pins 254. A partition portion 250, is also disposed between the electric connecting terminals 252 and 253. Each of the electric connecting terminals 252 and 253 has an electric contact 255 at its rear end and a bent portion 256 at its front end. Each bent portion 256 extends upwardly along the front wall 244*a* of rear member 244 and is then bent to be in close contact with the corresponding one of the electric contact terminals 262*a* and 262*b*.

On the other hand, an electric power connector 290 with a well-known construction is fitted in the rear portion of the fixed receptacle body 220. The electric power connector 290 comprises a pair of electric contact terminals 291 (only one shown in FIG. 12) connected with electric power source wires 44 and a pair of electric connecting terminals 293 and 294 attached to the lower surface of the electric power connector 290 and connected to the electric contact terminals 291, respectively. Each of the electric connecting terminals 293 and 294 has at its front end an electric contact 295 which comes selectively into contact with the electric contact 255 of the corresponding one of electric connecting terminals 252 and 253.

The electric contact between electric contacts 255 and 295 is maintained when the slide receptacle body 240 is disposed at its protruded position. As the slide receptacle body 240 moves rearwardly from its protruded position, the electric connecting terminals 252 and 253 of the rear member 244 move rearwardly, thereby causing the electric contacts 255 to separate from the electric contacts 295 of the electric connecting terminals 293 and 294.

Figure 11:
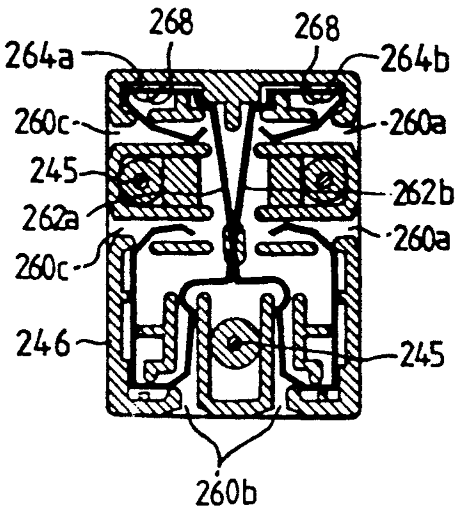
FIG. 11 is a cross-sectional view taken along the line 11—11 of FIG. 10.
Figure 12:
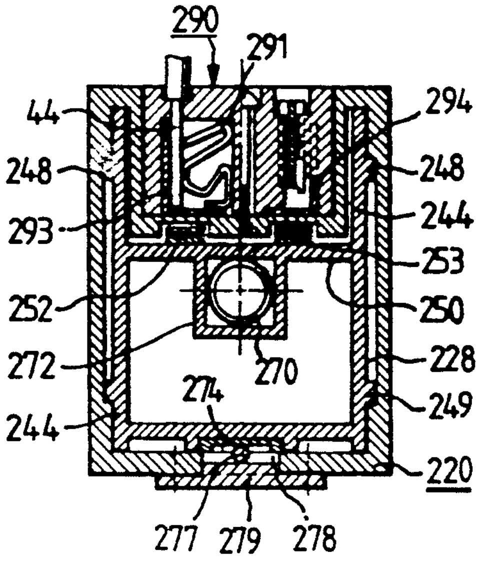
FIG. 12 is a cross-sectional view taken along the line 12—12 of FIG. 10.
Figure 13:
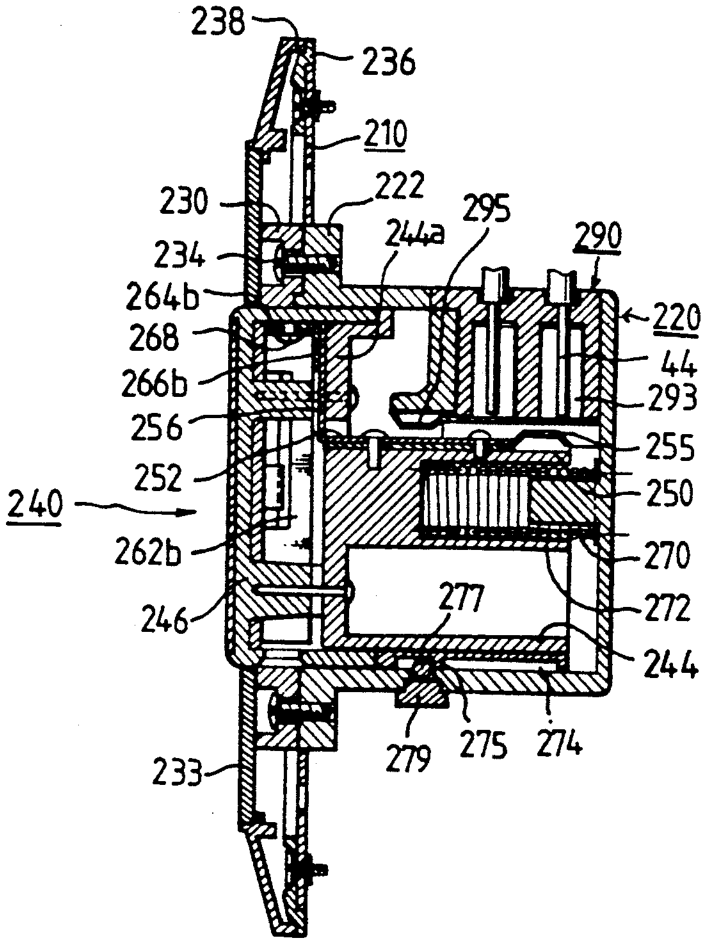
FIG. 13 is a view similar to FIG. 10, showing a condition when the slide receptacle body is disposed at its withdrawn position.

As mentioned above, the front member 246 has a pair of electric contact terminals 262*a* and 262*b* arranged in a X-shaped manner, as shown in FIG. 11. However, the electric contact terminals 262*a* and 262*b* are vertically spaced from each other, so as to prevent them from coming into contact with each other at their cross portions. As shown in FIG. 11, the electric contact terminals 262*a* and 262*b* have at their upper ends connecting portions 264*a* and 264*b*, respectively. The connecting portions 264*a* and 264*b* are fixed to the front member 246 by means of rivets 268 and provided with bent ends 266.

In accordance with this embodiment of the present invention, the receptacle 200 also comprises a control device for controlling the forward and rearward movements of the slide receptacle body between its withdrawn position and its protruded position, which control device is a ball type push-push mechanism.

Figure 14:
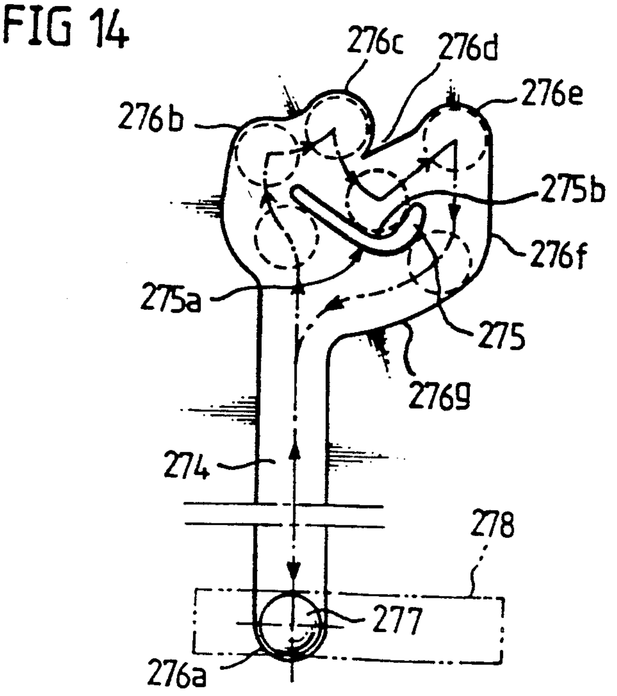
FIG. 14 is an enlarged view showing a portion of a control device which comprises a ball type push-push mechanism.

The ball type push-push mechanism comprises a guide groove 274 and a guide jaw 275 both being formed at the lower surface of the lower wall portion of rear member 244 of slide receptacle body 240. As shown in FIG. 14, the guide groove 274 has at its peripheral edge a plurality of guide portions 276*a* to 276*g*. On the other hand, the guide jaw 275 has a guide surface 275*a* and a V-shaped locking groove 275*b*.

The ball type push-push mechanism also comprises a ball support plate 279 provided at the lower wall portion of fixed receptacle body 220 and having a ball receiving slot 278 extending laterally, and a ball received in the ball receiving slot 278 at its lower half portion and in the guide groove 274 at its upper half portion.

The ball type push-push mechanism with the above-mentioned construction operates in a well-known manner, to slide the slide receptacle body 240 forwardly and rearwardly between its protruded position where the apertures 260*a* to 260*c* of electric outlets are externally exposed and its withdrawn position where the apertures 260*a* to 260*c* of electric outlets are hidden.

That is, at a state of FIG. 10 that the slide receptacle body 240 is disposed at its protruded position, the ball 277 is disposed at the guide jaw portion 276a formed at the rear end (the lower end in FIG. 14) of the guide groove 274. At the protruded position of the slide receptacle body 240, the apertures 260a to 260c of electric outlets and thus the electric contact terminals 262a and 262b are externally exposed so that plugs of electric appliances (not shown) can be inserted connected to the exposed apertures 260a to 260c under the condition that they are disposed in parallel to the front surface of the receptacle. On the other hand, the ball 277 is seated in the v-shaped locking groove 275b at a state of FIG. 13 where the slide receptacle body 240 is disposed at its withdrawn position where the apertures 260a to 260c of electric outlets are hidden in the fixed receptacle body 220.

The three-directional-apertured receptacle 200 with the above-mentioned construction and effect is more preferred over the single-apertured receptacle 100 of the previous embodiment, in that the constructions of fixed and slide receptacle bodies 220 and 240 and the ball type push-push mechanism are more simple.

As apparent from the above description, the present invention provides an electric wall receptacle having shuttable retractable electric outlets of a high quality capable of satisfying all requirements for improving safety, design, economy, and convenience in use. For example, it will be noted that in both embodiments of the invention the means for controlling sliding movement of the electric receptacle is advantageously combined with the means for locking the receptacle in its withdrawn and protruded positions, and that such combined means (the rod type and ball type push-push mechanisms) are completely concealed within the receptacle body for a favorable appearance. Similarly, all of the screws and other fasteners connecting the several components of the receptacle together, including screws 34, 134, 234, are concealed behind the outer plate 40, 233 for a very favorable appearance. Further, sliding movement of the receptacle between its protruded and withdrawn positions is simply and easily achieved by applying a slight pressure to the outer face of the slide receptacle body.

Although the preferred embodiments of the invention have been disclosed for illustrative purpose, those skilled in the art will appreciate that various modifications, additions and substitutions are possible, without departing from the scope and spirit of the invention as disclosed in the accompanying claims. For example, the control device for controlling the sliding movement of slide receptacle body may be of other constructions. Furthermore, the electric contact terminals may include three prongs including a ground prong. The electric connection between the electric contact terminals and the electric power source wires may be also achieved by other constructions.

For providing an improvement in appearance design which is one of important purposes of the present invention, the front end of slide receptacle body and the outer plate which are formed into vertical surfaces may be decorated with various patterns as shown in FIGS. 15-19.

The shapes of receptacle bodies and support plate may be also modified, for improving the productivity or changing other elements.

In some applications, the receptacle may have a simple construction, by modifying the construction of fixing plate. If necessary, the receptacle may have packings at the opening of outer plate through which the slide receptacle body passes, so as to be used at places such as floors and other places requiring waterproof and dustproof characteristics.

Where the receptacle of the present invention is used at places such as the outdoors and a campsite, it may be equipped at its outer plate with a lock for preventing the protrusion of slide receptacle body. With this provision, it is possible to avoid conveniently and effectively the use of electric power by unauthorized persons.

What is claimed is:

1. A slide type electric receptacle comprising:

a fixing plate adapted to be mounted to a box buried in a place at which the receptacle is to be installed;

a fixed receptacle body adapted to be inserted into the box and supported at its front end to the fixing plate, the fixed receptacle body having at its front end an opening;

an outer plate mounted to the fixing plate and provided with an opening;

a slide receptacle body having a box shape including opposite side walls and a lower wall and inserted into the fixed receptacle body through the opening of the outer plate and the opening of the fixed receptacle body, the slide receptacle body having at least one electric outlet at least one of the walls thereof and at least one set of electric contact terminals aligned with the electric outlet at its interior, the slide receptacle body also being slidable forwardly and rearwardly in a direction perpendicular to the outer plate between a protruded position where the electric outlet is exposed externally of the fixed receptacle body and a withdrawn position where the electric outlet is hidden in the fixed receptacle body;

a spring adapted to urge the slide receptacle body toward the protruded position thereof;

means for electrically connecting the electric contact terminals to an electric power source; and means for controlling the sliding movement of the slide receptacle body between the protruded position and the withdrawn position and for selectively locking the slide receptacle body at the withdrawn position, said sliding movement controlling and locking means being concealed within the fixed receptacle body and the slide receptacle body.

2. A slide type electric receptacle in accordance with claim 1, wherein the slide receptacle body comprises a front member provided with the electric outlet and the electric contact terminals and protruded outwardly of the outer plate at the protruded position of the slide receptacle body and a rear member coupled to the front member and disposed in the fixed receptacle body to slide along the fixed receptacle body.

3. A slide type electric receptacle in accordance with claim 1, wherein the means for electrically connecting the electric contact terminals to an electric power source comprises an electric connecting terminal disposed in the slide receptacle body and having one end connected with each of the electric contact terminals and the other end provided with a slide electric contact, and an electric power connector disposed in the fixed receptacle body and having a fixed electric contact adapted to come into contact with the slide electric contact of electric connecting terminal only at the protruded position of the slide receptacle body.

4. A slide type electric receptacle in accordance with claim 1 or claim 2, wherein the slide receptacle body has at least one electrical outlet at each of the opposite side walls and the lower wall thereof and a single set of electric contact terminals arranged in a X-shaped manner in the interior thereof, said single set of electric contact terminals being aligned with all of said electric outlets in said side walls and said lower wall for concurrently supplying power to said outlets.

5. A slide type electric receptacle in accordance with claim 1, wherein the sliding movement controlling and locking means comprises a rod type push-push mechanism.

6. A slide type electric receptacle in accordance with claim 1, wherein the sliding movement controlling and locking means comprises a ball type push-push mechanism.

7. A slide type receptacle in accordance with claim 5, wherein said rod type push-push mechanism comprises a guide surface defined in said slide receptacle body, and an actuating rod having one end connected to said fixed receptacle body and an opposite end operatively engaged with said guide surface; and said spring is disposed in parallel with said actuating rod and urges said opposite end of the actuating rod into engagement with said guide surface.

8. A slide type receptacle according to claim 7, wherein said rod type push-push mechanism includes a plurality of guide surfaces defined in said slide receptacle body for guiding said opposite end of the actuating rod when said slide receptacle body is moved between the protruded and withdrawn positions thereof and a locking member for selectively locking said opposite end of the actuating rod in a predetermined position when the slide receptacle body is moved to its withdrawn position.

9. A slide type electric receptacle according to claim 8, wherein said locking member is a guide jaw also defined in said slide receptacle body.

10. A slide type electric receptacle according to claim 9, wherein said guide jaw includes a substantially V-shaped locking groove.

11. A slide type electric receptacle in accordance with claim 6, wherein said ball type push-push mechanism comprises a guide groove defined in said slide receptacle body and a ball operatively supported between said slide receptacle body and said fixed receptacle body such that said ball moves along said guide groove as the slide receptacle body is moved between its protruded and withdrawn positions.

12. A slide type electric receptacle according to claim 11, wherein said ball type push-push mechanism further comprises a locking member for selectively locking said ball in a predetermined position when the slide receptacle body is moved to its withdrawn position.

13. A slide type electric receptacle in accordance with claim 12, wherein said locking member is a guide jaw defined in said slide receptacle body.

14. A slide type electric receptacle according to claim 13, wherein said guide jaw is substantially V-shaped with a locking groove defined by one face thereof and a guide surface defined by an opposite face thereof.

15. A slide type electric receptacle in accordance with claim 1, wherein each said electric outlet of said slide receptacle body is adapted to receive electrical plugs in a direction parallel to the outer plate.

16. A slide type electric receptacle according to claim 1, wherein an outer most face of said slide receptacle body is decorated with an ornamental pattern.

17. A slide type electric receptacle according to claim 16, wherein said outer plate conceals all fasteners connecting the fixing plate, the fixed receptacle body and the outer plate together.

18. A slide type electric receptacle according to claim 1, wherein said slide receptacle body is adapted to be moved between said protruded and concealed positions by applying a slight pushing force to an outer face of said slide receptacle body.

* * * * *